United States Patent
Constantinescu (10) Patent No.: US 7,124,332 B2
(45) Date of Patent: Oct. 17, 2006

(54) FAILURE PREDICTION WITH TWO THRESHOLD LEVELS

(75) Inventor: Cristian N. Constantinescu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 10/610,973

(22) Filed: Jun. 30, 2003

(65) Prior Publication Data

US 2004/0268189 A1   Dec. 30, 2004

(51) Int. Cl.
*G06F 11/27* (2006.01)

(52) U.S. Cl. .......................... 714/52; 714/704; 714/706

(58) Field of Classification Search ................. 714/52, 714/706; G06F 11/27
See application file for complete search history.

(56) References Cited

U.S. PATENT DOCUMENTS 5,751,725 A * 5/1998 Chen ........................... 714/708
5,956,125 A * 9/1999 Rosse et al. ................. 351/221
6,826,157 B1 * 11/2004 Davis et al. ................. 370/252

OTHER PUBLICATIONS

A. W. Berger et al., Performance Chracterizations of Traffic Monitoring, and Associated Control, Mechanisms for Broadband "Packet" Networks, 1990 IEEE, 400B.2.1-400B.2.5.
Briggs et al., Intel 870: A Building Block For Cost-Effective, Scalable Servers. 2002 IEEE, pp. 36-47.
C.L. Chen and M.Y. Hsiao, Error-Correcting Codes for Semiconductor Memory Applications: A State-of-the-Art Review. IBM J. Res. Develop. vol. 28. No. 2. Mar. 1984.
Constantinescu. Impact of Deep Submicron Technology on Dependability of VLSI Circuits. 2002 IEEE.
Lin et al., Error Log Analysis: Statistical Modeling and Heuristic Trend Analysis. Oct. 1990 IEEE. vol. 39. No. 4. pp. 419-432.

* cited by examiner

*Primary Examiner*—R. Stephen Dildine
(74) *Attorney, Agent, or Firm*—Rob D. Anderson (57) ABSTRACT

In some embodiments, a first comparator compares a first error rate and a first threshold value and a second comparator compares a second error rate and a second threshold value. Other embodiments are described and claimed.

41 Claims, 4 Drawing Sheets

FAILURE PREDICTION WITH TWO THRESHOLD LEVELS

TECHNICAL FIELD

The inventions generally relate to failure prediction.

BACKGROUND

It has been estimated by Lin and Siewiorek in "Error Log Analysis: Statistical Modeling and Heuristic Trend Analysis", IEEE Transactions on Reliability, Vol. 39, No. 4, 1990 that about 90% of the crashes experienced by computing systems are due to intermittent and transient faults. It has also been determined that most of the permanent faults are preceded by intermittent faults. The rates of occurrence of intermittent faults are expected to increase as transistor and interconnect dimensions shrink (see for example, C. Constantinescu, "Impact of Deep Submicron Technology on Dependability of VLSI Circuits", Proc. of the International Conference on Dependable Systems and Networks, Washington, D.C., USA, 2002). Early detection of failure prone circuits or subsystems such as processors, memory, interconnects, input/output channels and devices significantly improves availability of computing systems. Isolation of a failing component before a crash occurs allows scheduling of preventive maintenance, seamless activation of a spare, or graceful degradation (if spares are not available).

Conventional failure prediction mechanisms rely on the counting of errors that occur within a component or a subsystem. A failure is considered eminent when the number of errors reaches a predetermined threshold over a given period of time. As a result, the component is isolated and further action is taken (for instance a spare is activated, followed by replacement of the failing part). This scheme is also known as "leaky bucket" and was initially used for traffic control in asynchronous transfer mode networks (see for example, A. W. Berger et al. in "Performance Characteristics of Traffic Monitoring, and Associated Control, Mechanisms for Broadband Packet Networks", IEEE Global Telecommunications Conference, Vol. 1, 1990). The main problem with this type of approach is that errors in predicting failures can easily occur. For instance, a system crash can occur before the error threshold is reached, due to spikes in the error rate, separated by a relatively long period of time with no errors. Such a behavior is common in the case of intermittent faults experienced in VLSI circuits. If the error threshold is set to a very low value, to avoid the previous scenario, a good component may be replaced due to a small number of transient errors, induced by environmental conditions.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to failure prediction. In some embodiments failure prediction allows computer manufacturers to increase system availability. In some embodiments errors in predicting failures are avoided using two programmable threshold levels.

Figure 1:
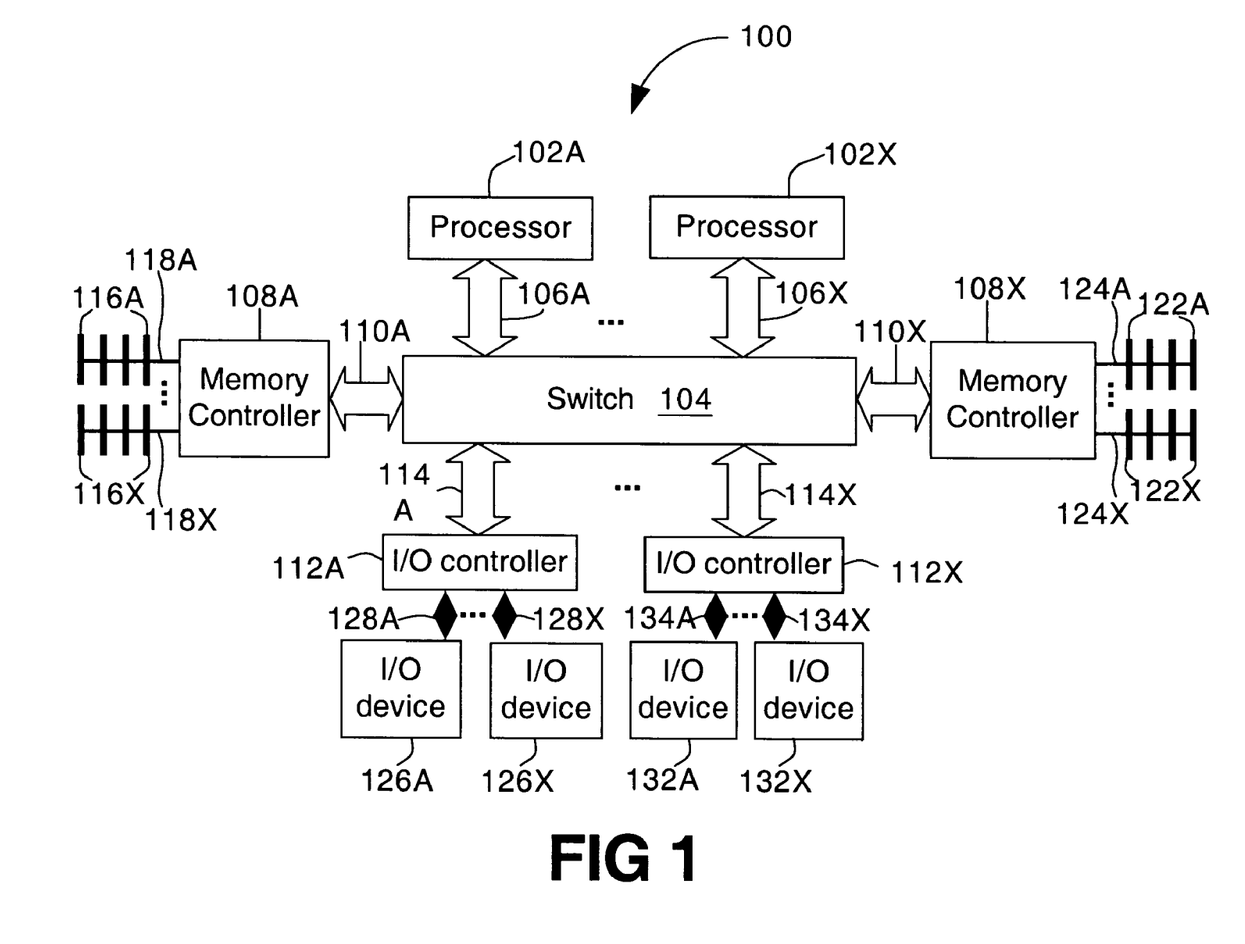
FIG. 1 is a block diagram representation of a system in which some embodiments of the inventions may be implemented.

FIG. 1 illustrates a system 100 in which some embodiments may be implemented. System 100 includes two or more processors 102A through 102X, a switch 104 (for example, a chip set), two or more interconnects 106A through 106X, two or more memory controllers 108A through 108X, two or more interconnects 110A through 110X, two or more Input/Output (I/O) controllers 112A through 112X, two or more interconnects 114A through 114X, two or more sets of memory modules 116A through 116X, two or more memory channels 118A through 118X, two or more sets of memory modules 122A through 122X, two or more memory channels 124A through 124X, two or more I/O devices 126A through 126X, two or more I/O channels 128A through 128X, two or more I/O devices 132A through 132X, and two or more I/O channels 134A through 134X.

The dots between interconnects 106A and 106X are used to show that there can be any number of processors 102A through 102X and a corresponding number of associated interconnects 106A through 106X. The dots between interconnects 114A and 114X are used to show that there can be any number of I/O controllers 112A through 112X and a corresponding number of associated interconnects 114A through 114X.

The dots between memory channels 118A and 118X are used to show that there can be any number of memory modules 116A through 116X and a corresponding number of associated memory channels 118A through 118X. The dots between memory channels 124A and 124X are used to show that there can be any number of memory modules 122A through 122X and a corresponding number of associated memory channels 124A through 124X. There can be any number of memory controllers 108A through 108X and a corresponding number of associated interconnects 110A through 110X, along with associated sets of memory modules and memory controllers for each of the memory controllers 108A through 108X, although there are no dots in FIG. 1 to show it.

The dots between I/O channels 128A and 128X are used to show that there can be any number of I/O devices 126A through 126X and a corresponding number of associated I/O channels 128A through 128X. The dots between I/O channels 134A and 134X are used to show that there can be any number of I/O devices 132A through 132X and a corresponding number of associated I/O channels 134A through 134X. The dots between interconnects 114A and 114X are used to show that there can be any number of I/O controllers 112A through 112X and a corresponding number of associated interconnects 114A through 114X, along with associated sets of I/O devices and I/O channels for each of the I/O controllers 112A through 112X.

Processors 102A through 102X are coupled to switch 104 by interconnects 106A through 106X, respectively. Memory controllers 108A through 108X are coupled to switch 104 by interconnects 110A through 110X, respectively. I/O controllers 112A through 112X are coupled to switch 104 by interconnects 114A through 114X, respectively. Memory modules 116A through 116X are coupled to memory controller 108A by memory channels 118A through 118X, respectively. Memory modules 122A through 122X are coupled to memory controller 108X by memory channels 124A through 124X, respectively. I/O devices 126A through 126X are coupled to I/O controller 112A by I/O channels 128A through 128X, respectively. I/O devices 132A through 132X are coupled to I/O controller 112X by I/O channels 134A through 134X, respectively.

The operation of all components and/or subsystems shown in FIG. 1 is monitored by error detection mechanisms. For instance, error correcting codes (ECC), parity and checking for protocol violations are used by the switch 104 (for example, the chip set). This is described, for example in an article by F. Brigs et al., "Intel 870: A Building Block for Cost-Effective, Scalable Servers", IEEE Micro, Vol. 22, No. 2 , 2002. Similarly, interconnects and I/O channels use ECC, cyclic redundancy codes (CRC) or parity to detect transmission errors. Memory subsystems rely on ECC to preserve data integrity, for example, as described by C.L. Chen and M. Y. Hsiao, "Error-Correcting Codes for Semiconductor Memory Applications: A State-of-the-Art Review", IBM Journal of Research and Development, Vol. 28, No. 2, 1984. I/O devices employ ECC or CRC for data protection. ECC also provides recovery capabilities, typically for single-bit errors. Transaction retry is usually required for recovery if CRC or parity are used for error detection. In some embodiments a mechanism may be employed to provide failure prediction for the components and subsystems previously mentioned, as well as any device which features error detection and recovery capabilities.

FIG. 1 has been illustrated and described as a system 100 including one switch 104 (such as a chip set). However, in some embodiments system 100 includes two or more switches similar to switch 104, which may be coupled together. Each of the switches 104 in some embodiments have similar components coupled thereto (e.g., processors, memory controllers, I/O controllers, etc.). Also, each of the components coupled to one of the two or more switches 104 may be coupled to any of the other components, including components coupled to different switches. For example, a memory controller coupled to first switch may be coupled directly to a memory controller coupled to a second switch. Many embodiments are possible including different systems 100 or other systems, and many different arrangements of components are possible. For example, embodiments may be implemented on different systems using ring connections, point-to-point connections, bus connections and other connections. Some embodiments are implemented in systems where multiple redundant switches are included.

FIG. 1 illustrates a system in which some embodiments may be implemented. However, there are many other systems in which some embodiments may be implemented, some that are similar to the system illustrated in and described in reference to FIG. 1 and some that are not similar to that system. Some embodiments may be implemented to predict failures in any system having components and/or subsystems that may fail.

Figure 2:
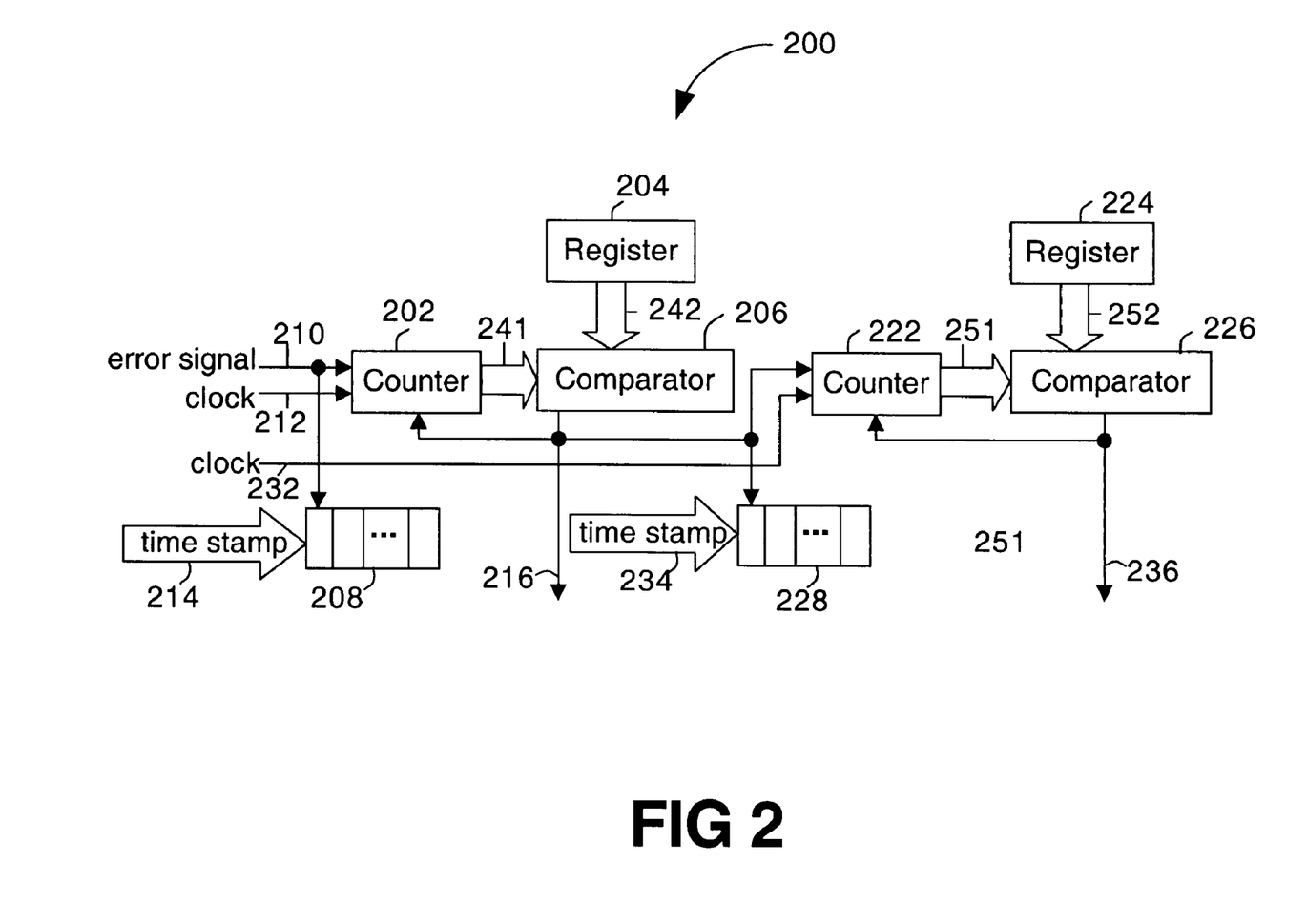
FIG. 2 is a block diagram representation of some embodiments of the inventions.

FIG. 2 illustrates a block diagram of an apparatus 200 according to some embodiments. Apparatus 200 includes an up/down counter 202, a register 204, a comparator 206, a first in first out (FIFO) memory 208, an error signal input 210, a clock input 212, a time stamp 214, an interrupt signal 216, an up/down counter 222, a register 224, a comparator 226, a FIFO memory 228, a clock input 232, a time stamp 234 and an interrupt signal 236. In some embodiments apparatus 200 can provide failure prediction for any associated component or subsystem for which failure prediction may be beneficial.

The counter 202 includes an up input coupled to the error signal input 210, a down input coupled to the clock input 212, a reset input coupled to an output of comparator 206 and an output 241 coupled to an input of comparator 206. Counter 202 is incremented by each occurrence of an error indication provided by error signal 210. The error indication provided by error signal 210 is provided by any error detection mechanism. Each occurrence of the error signal 210 is also used to store a current time stamp value 214 in the FIFO memory 208. Counter 202 is periodically decremented by clock input 212, which may be any programmable clock or any way of indicating a clock signal or periodic signal. In some embodiments clock input 212 is a programmable clock signal.

A programmable threshold value is stored in register 204. Comparator 206 compares the programmable threshold value stored in register 204 with the content (output 241) of counter 202. An interrupt signal 216 which in some embodiments is a low priority interrupt is activated via comparator 206 when the number of errors received via error signal 210 on the up input of counter 202 minus the number of clock pulses received via clock input signal 212 on the down input of counter 202 equals the threshold value stored in register 204 (output 242). Interrupt signal 216 is also fed back to the reset input of counter 202 to reset counter 202.

FIFO memory 228 stores a current time stamp value 234 in response to interrupt signal 216. In some embodiments interrupt 216 is also provided at an up input to counter 222. A down input of counter 222 is coupled to clock input signal 232, which is some embodiments may be a programmable clock value. In some embodiments the programmable clock value of clock input 232 is different than the programmable clock value of clock input 212. In some embodiments the programmable clock value of clock input 232 is larger than the programmable clock value of clock input 212. In a manner similar to comparator 206, comparator 226 compares a threshold value stored in register 224 (output 252) with output 251 from counter 222. An interrupt 236 is provided from comparator 226 when the number of pulses received at the up input of counter 222 (that is, the interrupt 216 pulses) minus the number of clock pulses received at the down input of counter 222 (that is, the clock 232 pulses) is equal to the threshold value stored in register 224 (output 252). In some embodiments interrupt signal 236 is a high priority interrupt. In some embodiments interrupt signal 236 is a high priority interrupt signaling an imminent failure of a component, subsystem, system and/or some other element. Interrupt signal 236 is also fed back to a reset input of counter 222.

Failure prediction according to some embodiments such as the embodiment illustrated in and described in reference to FIG. 2 provides two threshold levels and two interrupt signals. In embodiments illustrated in FIG. 2 interrupt signals 216 and 236 are respectively asserted when the first and second threshold values are reached.

In some embodiments the role of interrupt 216 is to request preventive maintenance when the rate of occurrence of errors experienced by a component or subsystem is higher than a frequency of clock 212, and a number of errors equal to the threshold stored in register 204 have accumulated in counter 202. In this manner in some embodiments short duration spikes in the error rate can be filtered out without generating an interrupt. Such short duration spikes in the error rate can be commonly induced, for example, by environmental changes. In some embodiments the interrupt 216 is asserted when the error rate surpasses the clock frequency for the first time (that is, no filtering) by using a threshold value stored in register 204 of "1".

In some embodiments interrupt 236 is used to signal an imminent catastrophic failure and/or request isolation of the failing component or subsystem. In some embodiments interrupt 236 requests activation of a spare, and may also request graceful degradation if spares are not available. In some embodiments interrupt 236 is asserted when the rate of activation of interrupt 216 is higher than the frequency of clock 232 and a number of events are accumulated in counter 222 equal to the threshold value stored in register 224. This situation typically occurs when the monitored component or subsystem is experiencing large bursts of errors that are typically induced by intermittent faults.

Error rates vary in a very wide range from one component or subsystem to another. For example, error rates for a memory subsystem are very different from observed error rates for interconnects. Error threshold and clock programmability allows selection of appropriate values for asserting the low and high priority interrupts for a wide variety of applications (for example, using system software). Time stamps 214 and 234 that are stored in FIFOs 208 and 228 respectively are used for failure analysis according to some embodiments. Numerous techniques are available for generating programmable clocks and time stamps and are all contemplated for use in various embodiments.

Failure prediction may be implemented according to a wide variety of embodiments. For example, in some embodiments all devices illustrated in and described in reference to FIG. 2 are hardware implemented. In some embodiments counters 202 and 222, registers 204 and 224 and comparators 206 and 226 are all embedded in hardware and FIFOs 208 and 228 are implemented in software. In some embodiments all devices illustrated in and described in reference to FIG. 2 are software implemented. Other embodiments may be implemented where various elements of FIG. 2 are implemented in software and others are implemented in hardware. Additionally some embodiments do not include all elements of FIG. 2 and some embodiments include additional elements in addition to those of FIG. 2.

In some embodiments the failure prediction illustrated herein and/or described herein including embodiments in FIG. 2 provide failure prediction for at least one component and/or subsystem. In some embodiments failure prediction is provided for one or more component and/or subsystem in a computer system. In some embodiments failure prediction is provided for a component and/or subsystem, which can include one or more of a processor, a bus, a switch, a chip set, a memory, a memory module, a memory controller, a memory channel, an interconnect, an I/O controller, an I/O channel, an I/O device and a subsystem.

In some embodiments as illustrated in FIG. 2 an error signal received at an up input of counter 222 is an output from comparator 206. However, in some embodiments other error signals may be coupled to the up input of counter 222 instead of the output from comparator 206. In some embodiments the error signal 210 is coupled to the up input of counter 222.

Figure 3:
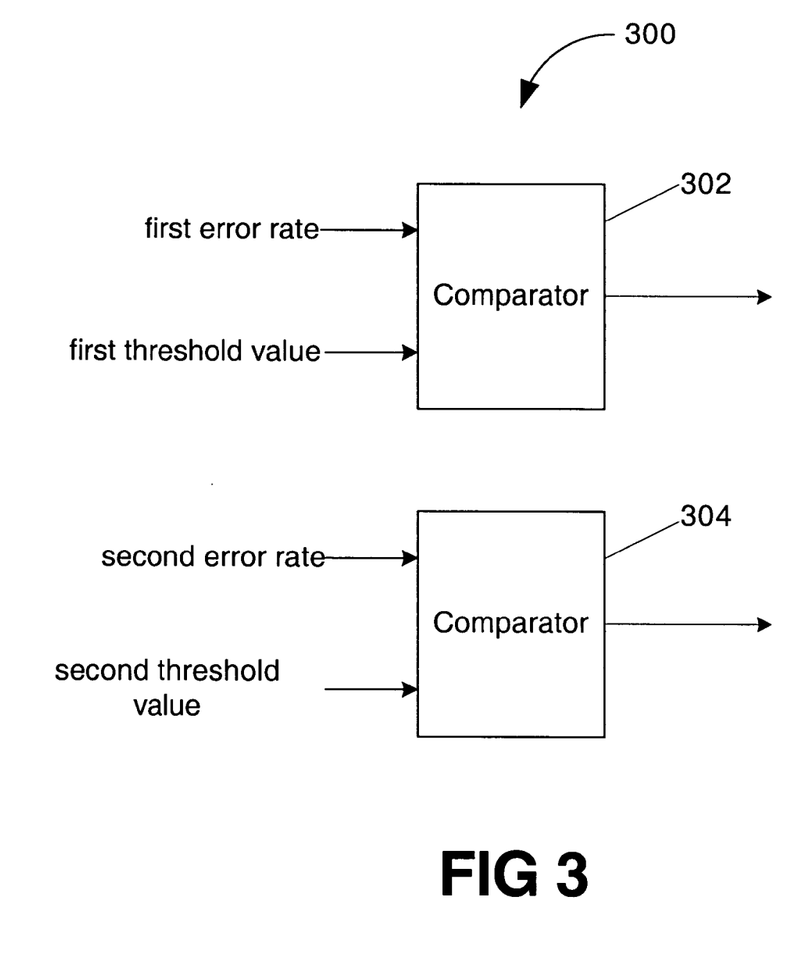
FIG. 3 is a block diagram representation of some embodiments of the inventions.

FIG. 3 illustrates a block diagram of an apparatus 300 according to some embodiments. Apparatus 300 includes a comparator 302 and a comparator 304. Comparator 302 compares a first error rate and a first threshold value. Comparator 304 compares a second error rate and a second threshold value. In some embodiments the first error rate illustrated in FIG. 3 is a difference between an error signal and a first clock signal. In some embodiments the second error rate illustrated in FIG. 3 is a difference between an output of the first comparator 302 and a second clock signal. In some embodiments the first error rate illustrated in FIG. 3 is a difference between an error signal and a first clock signal and the second error rate illustrated in FIG. 3 is a difference between the error signal and a second clock signal.

In some embodiments the output of comparator 302 is a request for preventive maintenance and the output of comparator 304 identifies an imminent failure. In some embodiments the output of comparator 302 is an interrupt signal that is a request for preventive maintenance and the output of comparator 304 is an interrupt signal that identifies an imminent failure.

In some embodiments a counter counts a difference between an error signal and a first clock frequency to obtain the first error rate illustrated in FIG. 3. In some embodiments a counter counts a difference between an output of the first comparator and a second clock frequency to obtain the second error rate illustrated in FIG. 3.

In some embodiments the first error rate and the second error rate illustrated in FIG. 3 are both error rates of a component in a computer system. In some embodiments the first error rate and the second error rate illustrated in FIG. 3 are both error rates of a component in a computer system, where the component is one or more of a processor, a bus, a switch, a chip set, a memory, a memory module, a memory controller, a memory channel, an interconnect, an I/O controller, an I/O channel, and I/O device and a subsystem. In some embodiments the first error rate illustrated in FIG. 3 is a difference between a number of errors and a frequency of a clock signal.

In some embodiments a counter counts the first error rate illustrated in FIG. 3 such that an up input of the counter is coupled to an error signal and a down input of the counter is coupled to a clock signal. In some embodiments the second error rate is a difference between a number of occurrences of an output of the first comparator 302 and a frequency of a clock signal. In some embodiments a counter counts the second error rate illustrated in FIG. 3, where an up input of the counter is coupled to an output of the first comparator and a down input of the counter is coupled to a clock signal. In some embodiments a counter counts the second error rate illustrated in FIG. 3, where an up input of the counter is coupled to an error signal and a down input of the counter is coupled to a clock signal. In some embodiments the first error rate illustrated in FIG. 3 is a difference between a number of errors and a frequency of a first clock signal and the second error rate illustrated in FIG. 3 is a difference between a number of occurrences of an output of the first comparator and a frequency of a second clock signal.

In some embodiments a first counter counts the first error rate illustrated in FIG. 3 such that an up input of the first counter is coupled to an error signal and a down input of the first counter is coupled to a first clock signal, and a second counter counts the second error rate such that an up input of the second counter is coupled to an output of the first comparator 302 and a down input of the second counter coupled to a second clock signal.

In some embodiments a first interrupt signal is coupled to an output of comparator 302 and a second interrupt signal is coupled to an output of comparator 304. In some embodiments a first interrupt signal to request preventive maintenance is coupled to an output of comparator 302 and a second interrupt signal to identify an imminent failure is coupled to an output of comparator 304.

Figure 4:
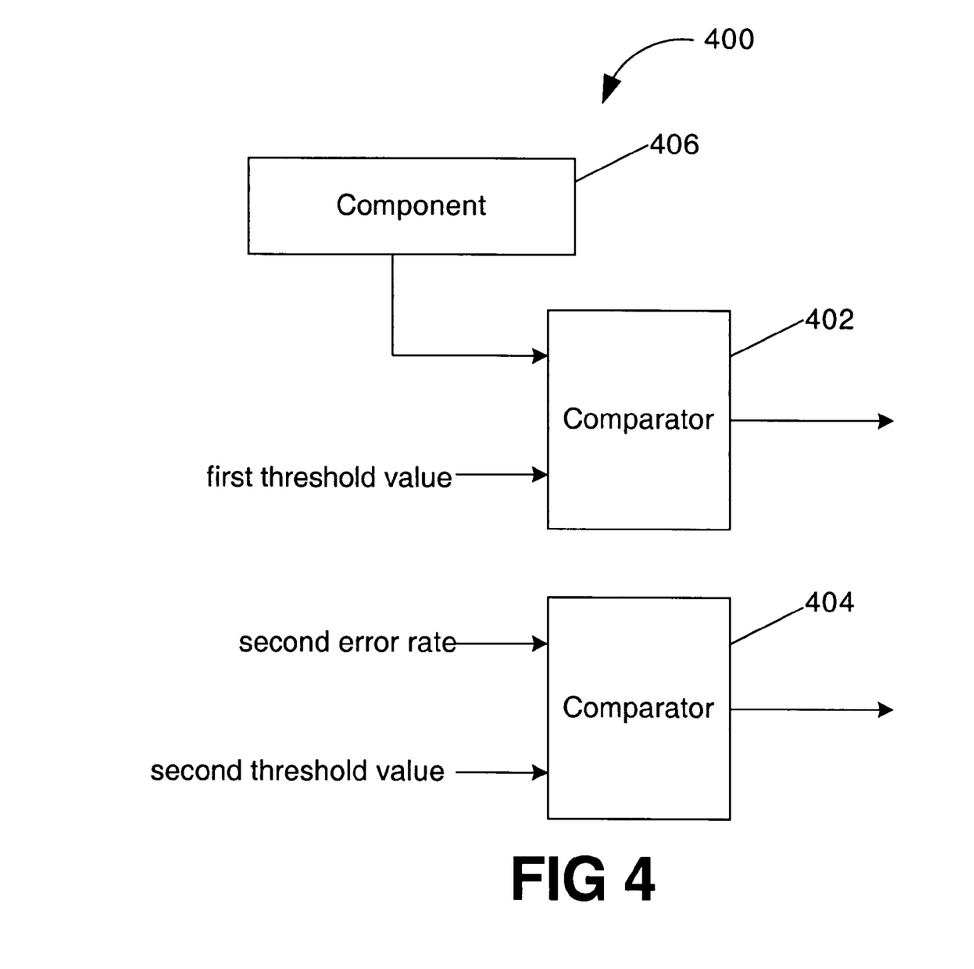
FIG. 4 is a block diagram representation of some embodiments of the inventions.

FIG. 4 illustrates a block diagram of a system 400 according to some embodiments. System 400 includes a comparator 402, a comparator 404 and a component 406. Comparator 402 compares a first error rate of the component and a first threshold value. Comparator 404 compares a second error rate of the component and a second threshold value. A first error rate of the component is sent from the component 406 to an input of the comparator 402. In some embodiments the first error rate is also provided from the component 406 to the second error rate input of the comparator 404. In some embodiments the output of comparator 402 is provided as a second error rate input to comparator 404. In some embodiments the output of comparator 402 is combined with some other signal such as a clock signal (for example, using a counter) and the combined signal is then input as the second error rate input of comparator 404.

In some embodiments the first error rate in FIG. 4 provided from component 406 to comparator 402 is a difference between an error signal and a first clock signal. This difference may be calculated in some other device between component 406 and comparator 402 (for example, using a counter). In some embodiments the second error rate in FIG. 4 is a difference between an output of the first comparator and a second clock signal. In some embodiments the second error rate in FIG. 4 is a difference between the first error rate and a second clock signal.

In some embodiments the output of comparator 402 is a request for preventive maintenance of the component and an output of comparator 404 identifies an imminent failure of the component.

In some embodiments a counter counts a difference between an error signal from the component and a first clock frequency to obtain the first error rate illustrated in FIG. 4 and input to comparator 402. In some embodiments a counter counts a difference between an output of the first comparator 402 and a second clock frequency to obtain the second error rate illustrated in FIG. 4.

In some embodiments component 406 is one or more of a processor, a bus, a switch, a chip set, a memory, a memory module, a memory controller, a memory channel, an interconnect, an I/O controller, an I/O channel, an I/O device and a subsystem.

In some embodiments a first signal is provided if a first error rate is greater than a first threshold value and a second signal is provided if a second error rate is greater than a second threshold value. In some embodiments the first error rate is a difference between an error signal and a first clock signal and the second error rate is a difference between the first signal and a second clock signal. In some embodiments the first error rate is a difference between an error signal and a first clock signal and the second error rate is a difference between the error signal and a second clock signal. In some embodiments the first signal is a request for preventive maintenance and the second signal identifies an imminent failure. In some embodiments a difference is counted between an error signal and a first clock frequency to obtain the first error rate. In some embodiments a difference is counted between the first signal and a second clock frequency to obtain the second error rate.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams have been used herein to describe embodiments, the inventions are not limited to those diagrams or to corresponding descriptions herein. For example, flow need not move through each illustrated box or exactly in the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
a first comparator to compare a first error rate and a first threshold value; and
a second comparator to compare a second error rate and a second threshold value;
wherein the first error rate and the second error rate are error rates of a component in a computer system.

2. The apparatus as claimed in claim 1, wherein the first error rate is a difference between an error signal and a first clock signal and the second error rate is a difference between an output of the first comparator and a second clock signal.

3. The apparatus as claimed in claim 1, wherein the first error rate is a difference between an error signal and a first clock signal and the second error rate is a difference between the error signal and a second clock signal.

4. The apparatus as claimed in claim 1, wherein an output of the first comparator is a request for preventive maintenance and an output of the second comparator identifies an imminent failure.

5. The apparatus as claimed in claim 1, further comprising a counter to count a difference between an error signal and a first clock frequency to obtain the first error rate.

6. The apparatus as claimed in claim 5, further comprising a counter to count a difference between an output of the first comparator and a second clock frequency to obtain the second error rate.

7. The apparatus as claimed in claim 1, wherein the component is at least one of a processor, a bus, a switch, a chip set, a memory, a memory module, a memory controller, a memory channel, an interconnect, an I/O controller, an I/O channel, an I/O device and a subsystem.

8. The apparatus as claimed in claim 1, wherein the first error rate is a difference between a number of errors and a frequency of a clock signal.

9. The apparatus as claimed in claim 1, further comprising a counter to count the first error rate, an up input of the counter coupled to an error signal and a down input of the counter coupled to a clock signal.

10. The apparatus as claimed in claim 1, wherein the second error rate is a difference between a number of occurrences of an output of the first comparator and a frequency of a clock signal.

11. The apparatus as claimed in claim 1, further comprising a counter to count the second error rate, an up input of the counter coupled to an output of the first comparator and a down input of the counter coupled to a clock signal.

12. The apparatus as claimed in claim 1, further comprising a counter to count the second error rate, an up input of the counter coupled to an error signal and a down input of the counter coupled to a clock signal.

13. The apparatus as claimed in claim 1, wherein the first error rate is a difference between a number of errors and a frequency of a first clock signal and the second error rate is a difference between a number of occurrences of an output of the first comparator and a frequency of a second clock signal.

14. The apparatus as claimed in claim 1, further comprising:
a first counter to count the first error rate, an up input of the first counter coupled to an error signal and a down input of the first counter coupled to a first clock signal; and
a second counter to count the second error rate, an up input of the second counter coupled to an output of the first comparator and a down input of the second counter coupled to a second clock signal.

15. The apparatus as claimed in claim 1, further comprising:
a first interrupt signal coupled to an output of the first comparator; and
a second interrupt signal coupled to an output of the second comparator.

16. The apparatus as claimed in claim 15, wherein the first interrupt signal is to request preventive maintenance and the second interrupt signal is to signal an imminent failure.

17. The apparatus as claimed in claim 1, further comprising:
a first memory to store a first time stamp in response to an error signal; and
a second memory to store a second time stamp in response to the output of the first comparator.

18. The apparatus as claimed in claim 17, wherein the first memory is to store a set of time stamps and the second memory is to store a set of time stamps.

19. A computer system comprising:
a component; and
a first comparator to compare a first error rate of the component and a first threshold value; and
a second comparator to compare a second error rate of the component and a second threshold value.

20. The system as claimed in claim 19, wherein the first error rate is a difference between an error signal and a first clock signal and the second error rate is a difference between an output of the first comparator and a second clock signal.

21. The system as claimed in claim 19, wherein the first error rate is a difference between an error signal and a first clock signal and the second error rate is a difference between the first error rate and a second clock signal.

22. The system as claimed in claim 19, wherein an output of the first comparator is a request for preventive maintenance of the component and an output of the second comparator identifies an imminent failure of the component.

23. The system as claimed in claim 19, further comprising a counter to count a difference between an error signal from the component and a first clock frequency to obtain the first error rate.

24. The system as claimed in claim 19, further comprising a counter to count a difference between the first signal and a second clock frequency to obtain the second error rate.

25. The system as claimed in claim 19, wherein the component is at least one of a processor, a switch, a chip set, a bus, a memory, a memory module, a memory controller, a memory channel, an interconnect, an I/O controller, an I/O channel, an I/O device and a subsystem.

26. A method comprising:
providing a first signal in response to a relationship between a first error rate and a first threshold value; and
providing a second signal in response to a second error rate and a second threshold value;
wherein the first error rate and the second error rate are error rates of a component in a computer system.

27. The method as claimed in claim 26, wherein the first signal is provided when the first error rate is greater than or equal to the first threshold value and the second signal is provided when the second error rate is greater than or equal to the second threshold value.

28. The method as claimed in claim 26, wherein the first error rate is a difference between an error signal and a first clock signal and the second error rate is a difference between the first signal and a second clock signal.

29. The method as claimed in claim 26, wherein the first error rate is a difference between an error signal and a first clock signal and the second error rate is a difference between the error signal and a second clock signal.

30. The method as claimed in claim 26, wherein the first signal is a request for preventive maintenance and the second signal identifies an imminent failure.

31. The method as claimed in claim 26, further comprising counting a difference between an error signal and a first clock frequency to obtain the first error rate.

32. The method as claimed in claim 31, further comprising counting a difference between the first signal and a second clock frequency to obtain the second error rate.

33. The method as claimed in claim 26, wherein the component is at least one of a processor, a bus, a switch, a chip set, a memory, a memory module, a memory controller, a memory channel, an interconnect, an I/O controller, an I/O channel, an I/O device and a subsystem.

34. An article comprising:
a computer readable medium having instructions thereon which when executed cause a computer to:
provide a first signal in response to a relationship between a first error
rate and a first threshold value; and
provide a second signal in response to a relationship between
a second error rate and a second threshold value;
wherein the first error rate and the second error rate are error rates of a component in a computer system.

35. The article as claimed in claim 34, wherein the first signal is provided when the first error rate is greater than or equal to the threshold value and the second signal is provided when the second error rate is greater than or equal to the second threshold value.

36. The article as claimed in claim 34, wherein the first error rate is a difference between an error signal and a first clock signal and the second error rate is a difference between the first signal and a second clock signal.

37. The article as claimed in claim 34, wherein the first error rate is a difference between an error signal and a first clock signal and the second error rate is a difference between the error signal and a second clock signal.

38. The article as claimed in claim 34, wherein the first signal is a request for preventive maintenance and the second signal identifies an imminent failure.

39. The article as claimed in claim 34, the computer readable medium further having instructions thereon which when executed cause a computer to count a difference between an error signal and a first clock frequency to obtain the first error rate.

40. The article as claimed in claim 39, the computer readable medium having further instructions thereon which when executed cause a computer to count a difference between the first signal and a second clock frequency to obtain the second error rate.

41. The article as claimed in claim 34, wherein the component is at least one of a processor, a bus, a switch, a chip set, a memory, a memory module, a memory controller, a memory channel, an interconnect, an I/O controller, an I/O channel, an I/O device and a subsystem.

* * * * *